OR 3,336,577

SEARCH ROO

JWC

INVENTOR.
K. H. FRIELINGHAUS
BY
Forest B. Hitchcock
HIS ATTORNEY

TELEMETERING SYSTEM

Filed July 15, 1963 7 Sheets-Sheet 2

INVENTOR.

K.H.FRIELINGHAUS

BY

Forest B. Hitchcock

HIS ATTORNEY

TELEMETERING SYSTEM

INVENTOR.
K.H.FRIELINGHAUS
BY Forest B. Hitchcock
HIS ATTORNEY

INVENTOR.
K.H.FRIELINGHAUS
BY
Forest B. Hitchcock
HIS ATTORNEY

INVENTOR.
K.H. FRIELINGHAUS
BY
Forest B. Hitchcock
HIS ATTORNEY

INVENTOR.
K.H. FRIELINGHAUS
BY Forest B. Hitchcock
HIS ATTORNEY

INVENTOR.
K.H.FRIELINGHAUS
BY
Forest B. Hitchcock
HIS ATTORNEY

United States Patent Office 3,336,577
Patented Aug. 15, 1967

3,336,577
TELEMETERING SYSTEM

Klaus H. Frielinghaus, Rochester, N.Y., assignor to General Signal Corporation, Rochester, N.Y., a corporation of New York Filed July 15, 1963, Ser. No. 294,878
5 Claims. (Cl. 340—163)

ABSTRACT OF THE DISCLOSURE

A telemetering system for communicating between a control office and a plurality of field stations. When a code of positive pulses is transmitted from the control office shift register to a field station shift register of a particular station, the system remains at rest for a predetermined time interval until the field station has time to use the code, after which time interval a code of negative pulses is transmitted from the field shift register of that station to the shift register at the control office giving the condition of the utilization means at such field station. When the field station code is received from a particular station, the system is then conditioned for again transmitting from the control office or any station. Multiaperture magnetic cores and other solid state devices are used in the construction of the system.

*Background and summary of invention*

This invention relates to telemetering systems and more particularly to systems for transmitting codes from a central control office to selected field stations and receiving codes at the control station from the selected field stations in response to the transmitted codes.

In telemetering systems wherein a control office provides control of operations at selected field stations, it is desirable to provide means at the control office for indicating the condition of each field station actuated from the control office. Moreover, it is desirable to provide means for transmitting independent signals from the field stations to the control office. Systems of this nature have wide application in railway centralized traffic control systems, pipeline control and monitoring systems, etc.

Heretofore, telemetering systems of the aforementioned type have required myriad relays, with attendant large power requirements, large volume installations, and relay maintenance requirements. The present invention overcomes these disadvantages by utilizing a minimum number of relays. Extensive use is made of solid state devices, thereby increasing reliability and decreasing power and space requirements.

Accordingly, one object of this invention is to provide a new and improved telemetering system.

Another object is to provide a telemetering system extensively utilizing solid state devices.

Another object is to provide a telemetering system having minimal power and space requirements.

Another object is to provide a telemetering system wherein a control signal sent from a central office to a preselected field station is registered on indication means at the control office after the field station has been actuated in accordance with the control signal and has assumed its new condition as designated by the control office.

Another object is to provide a telemetering system wherein any of a plurality of field stations is selectively actuated from a control office and retransmits a code produced in response to a code received from the office without actuating any of the other field stations.

The invention contemplates a central control office with satellite or field stations controlled therefrom. Means are provided at the control office for transmitting a preselected coded message to any predesignated one of the field stations, for control thereof. Means are provided at the predesignated field station for retransmission of the message after the field station has received and utilized the message. Means are also provided at the control office for receipt of the retransmitted utilized message. Additional means are provided to prevent transmission of subsequent messages from any location in the system during the interval between transmission of an original message from the control office and receipt of the retransmitted original message by the control office.

The foregoing and other objects and advantages of the invention will become apparent from the following detailed description when read in conjunction with the accompanying drawings in which.

Figure 1A:
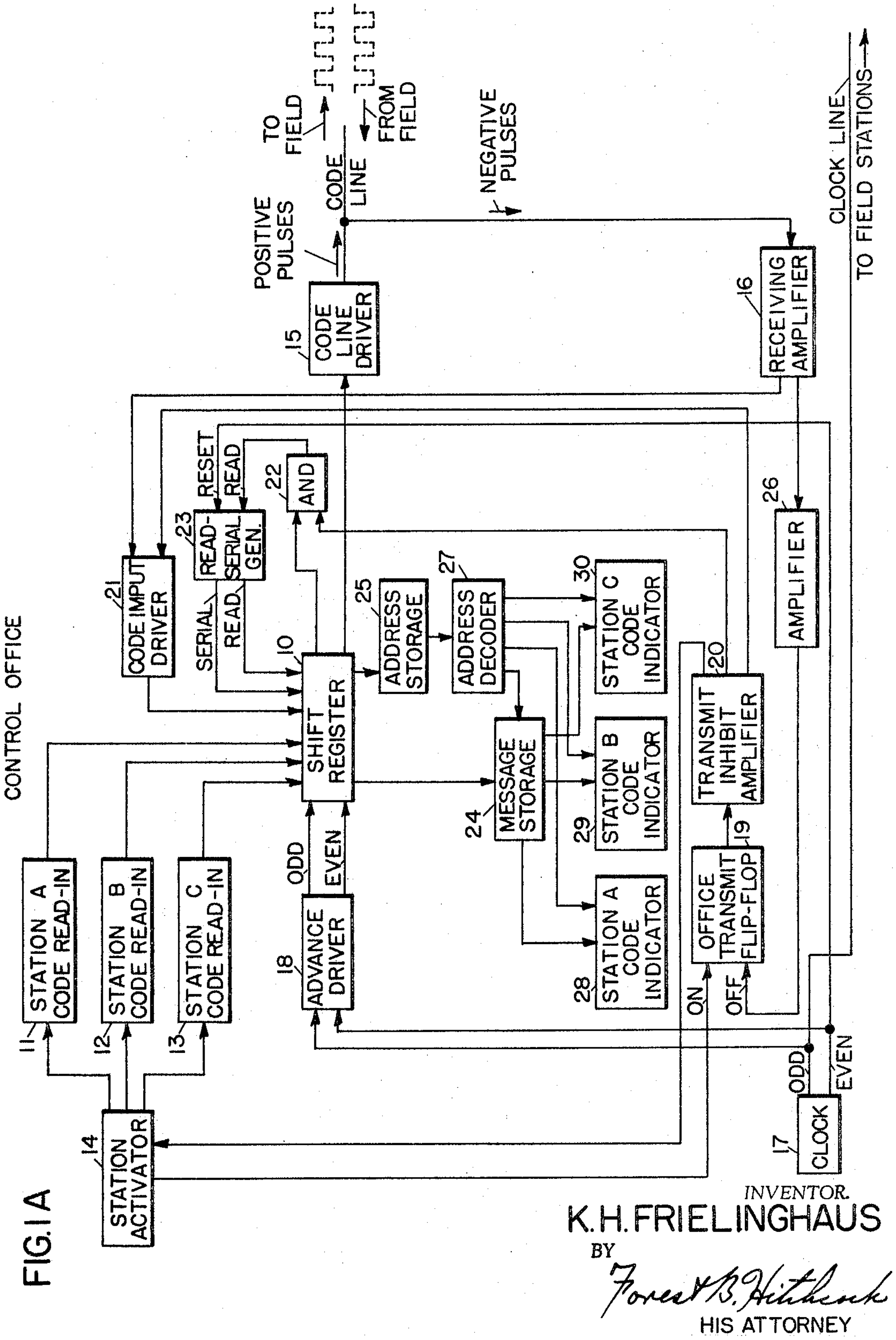
FIG. 1A is a block diagram of the control office used in the system.

Turning now to FIG. 1A, the control office is shown comprising a shift register 10 having three station code read-in circuits 11, 12 and 13 coupled thereto for establishing messages to be transferred to field stations A, B or C, respectively. A station activator unit 14 is coupled to the station code read-in circuits for causing the code selected by a read-in unit to be applied to the shift register. The station activator may comprise a plurality of push buttons, whereby depression of a predesignated button causes the proper code to be read into the shift register. Activation of any read-in unit also causes application of the proper address for the selected station to be read into the shift register also.

The shift register reads out serially onto the code line through a code line driver 15 which provides rectangular pulse shaping for the output code as well as impedance matching of the shift register to the code line. The code line driver circuit is so designed that only positive pulses are transmitted over the code line to the field stations; negative pulses received from the field stations are coupled to a receiving amplifier 16.

The office also contains a clock 17 comprising a suitable circuit such as a multivibrator. The clock produces both odd and even pulses. The odd pulses are coupled to a clock line which supplies odd pulses to the field stations as well as to the control office. At the control office both odd and even clock pulses are coupled to an advance driver circuit 18 which rectangularly shapes the pulses and couples them to the shift register, enabling the bits applied to the shift register from the station code read-in circuits to alternately shift through the entire shift register.

A transmit flip-flop circuit 19 is provided for locking the office in its transmit mode so that office-initiated messages are not treated at the office in the same manner as a message which has been received from a field station. Output from flip-flop 19 is coupled through a transmit inhibit amplifier 20 from which three outputs are provided. Thus, when flip-flop 19 is in an ON condition, as is the case when the control office is transmitting, a first output from amplifier 20 is applied to station activator 14, preventing a new code from being read into the shift register by locking out the station activator. A second inhibiting output from the amplifier is coupled to a code input driver circuit 21, preventing the driver from setting an initial magnetic core at the serial input end of the shift register. A third inhibiting output from the amplifier provides a first input to an AND circuit 22, the output of which is coupled to a read-serial generator 23. When both the AND circuit inputs are present, read-serial generator 23 applies read pulses to the shift register, causing the information received by the shift register from a field station to be applied to a message storage circuit 24 and an address storage circuit 25.

The office transmit flip-flop circuit is responsive to received signals on the code line and to the condition of station activator 14. Thus, operation of the station activator causes flip-flop circuit 19 to apply an inhibit signal to activator 14 and thereby prevent a new code from being read into the shift register, and to apply an inhibit signal code input driver 21 and thereby prevent the initial core at the serial input end of the shift register from becoming set.

When a negative pulse produced from a field station in response to an office message is received on the code line, a signal is coupled through amplifier 16 to an amplifier 26 which turns off transmit flip-flop circuit 19. Simultaneously a new signal is applied to code input driver 21 from amplifier 16. However, this pulse is not set into the office shift register, since code input driver 21 remains inhibited at the instant the received signal is turning off flip-flop 19, which subsequently causes removal of the inhibit signal applied to code input driver 21 from inhibit amplifier 20. This negative pulse also provides an indication at the control office that the field station has received the message transmitted by the office.

When information is stored in message storage circuit 24 and address storage circuit 25, the address is decoded in an address decoder circuit 27. The decoded address then provides a trigger pulse to the message storage circuit in the form of a prime signal for apertured magnetic cores in the message storage circuit. Thus, depending upon the decoded address, the message stored in message storage circuit 24 is applied to any station code indicator 28, 29 or 30, depending upon whether the address initially applied to shift register 10 was directed to station A, B or C, respectively.

As indicated in FIG. 1A, AND circuit 22 is a 2-input AND. One input is responsive to the OFF condition of transmit flip-flop circuit 19 through amplifier 20. The second input is responsive to the condition of a final magnetic core at the serial output end of the shift register; that is, when the final core is in a set condition, indicating that a "tag" bit is stored therein, a signal is applied to the read-serial generator, causing a read signal to then be applied to the shift register. The "tag" bit is a binary ONE, used as the first pulse serially transmitted to or from the shift register. It should also be noted that every even pulse from clock 17 causes reset of read-serial generator 23, thereby causing a serial prime current to be applied to the shift register. The utility of the read and serial prime currents, which are used for priming apertured magnetic cores in the shift register, is described in more detail infra.

Figure 1B:
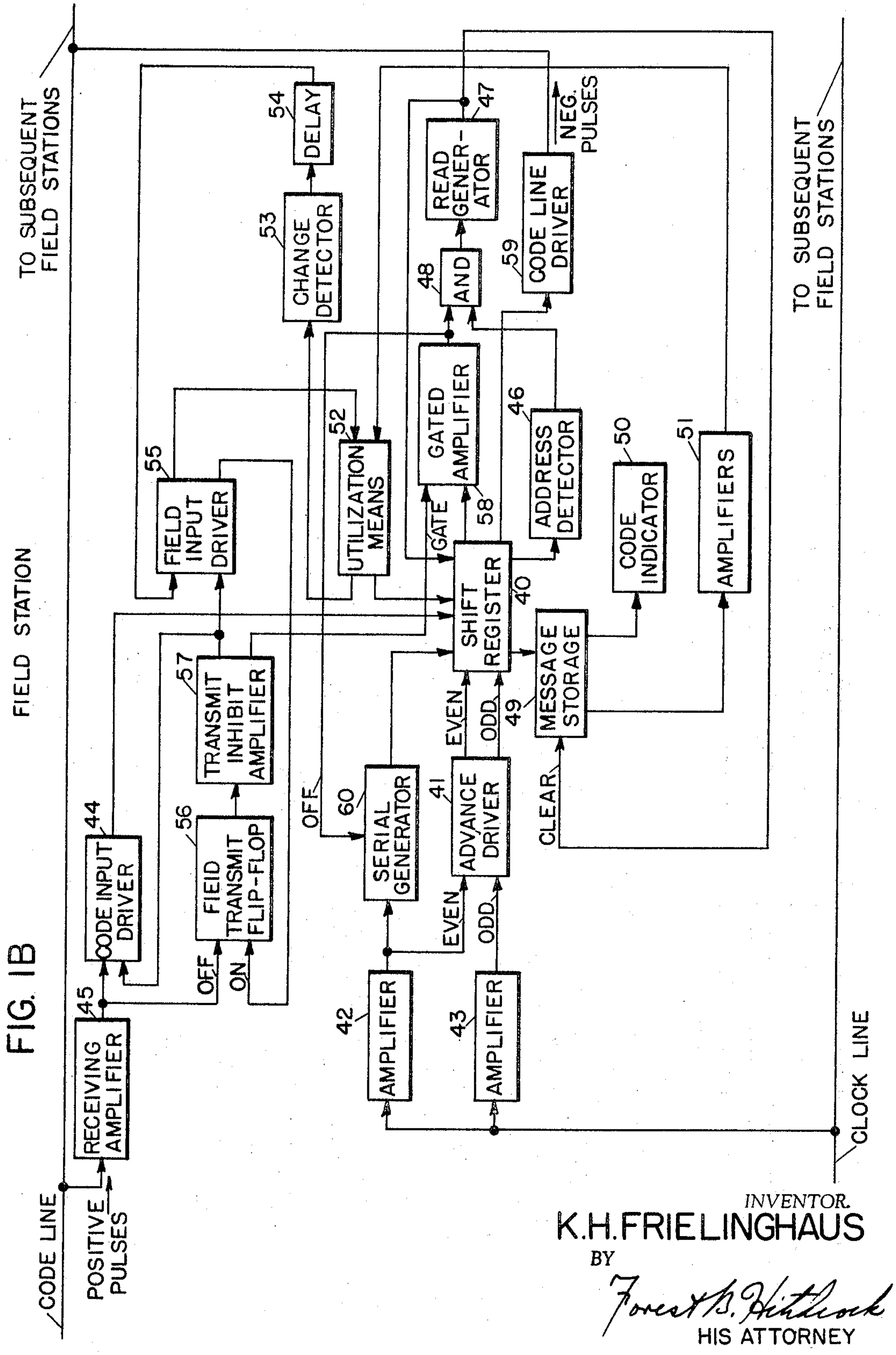
FIG. 1B is a block diagram of a typical field station used in the system.

Turning now to FIG. 1B for a description of a typical field station in the telemetering system, there is shown a shift register 40 which is similar in construction and operation to shift register 10 of FIG. 1A. The shift register is driven by an advance driver 41 operated in step with the office driver of FIG. 1A since it is driven from the clock line through either of a pair of amplifiers 42 and 43. Since the clock line carries odd clock pulses only, amplifier 42 provides a phase inversion, so as to produce even pulses from advance driver 41, while amplifier 43 provides no phase inversion, so as to provide odd pulses from advance driver 41. A transmitted code from the control office is serially applied to shift register 40 from a code input driver circuit 44 which receives code pulses through a receiving amplifier 45.

When the "tag" bit in the code received from the office arives at the final bit position in the shift register, the address in the coded information is decoded in an address detector circuit 46. This is achieved because the "tag" bit is always represented by a binary ONE: that is the pulse initially read out of or into a shift register is always a set pulse. Thus, presence of the "tag" bit indicates presence of the code, and avoids situations whereby a code comprises entirely of ZEROS would otherwise not be detected.

If upon decoding of the address, the message is determined intended for the field station illustrated in FIG. 1B, detector 46 triggers a read generator 47 through a 2-input AND circuit 48. The read generator produces parallel read-out from shift register 40 into a message storage circuit 49 after first clearing information previously stored in the message storage circuit.

A portion of the received message which may be used for visual signalling is indicated upon a code indicator 50, which receives its information from message storage circuit 49. In addition, the remainder of the message, used for control purposes, is read out of the message storage circuit 49 in parallel fashion through a group of parallel-connected amplifiers 51, to utilization means 52. The utilization means may comprise suitable electromechanical devices.

If the received message requires a change in condition of the utilization means, the change is detected by a change detector 53 which is coupled through a delay circuit 54 to an input of a field input driver circuit 55. The delay circuit permits all accomplished changes to be transmitted to the office in a single transmission which clears the entire shift register, by delaying detection of any changes to enable all accomplished changes to be detected prior to transmission. The condition of the electromechanical utilization means is also applied to the shift register preparatory to transmission to the office.

Receipt of a code from the office assures that a field transmit flip-flop circuit 56 is in its OFF condition. However, the flip-flop circuit is normally OFF at this time regardless of receipt of the office code, since the office produces a pulse which brings this condition about, after a message from a field station fills the office shift register. Thus, transmission from the field station is prevented.

At the end of the interval produced by delay circuit 54, the field message as determined by utilization means 52 is set into the shift register and simultaneously field transmit flip-flop circuit 56 is placed in its ON condition. This produces a signal through a transmit inhibit amplifier 57 to code input driver circuit 44, inhibiting output from the code input driver. Simultaneously, a signal is coupled to a second input of field input driver 55, inhibiting output from this driver circuit also.

An additional output from transmit inhibit amplifier 57 is coupled to the gating input for a gated amplifier 58. Output from this amplifier provides a second input to AND circuit 48. When the gating input is energized, no signal can be coupled from shift register 40 through gated amplifier 58 to AND circuit 48. However, when no output is produced from amplifier 57, gated amplifier 58 couples a signal from the "tag" storage portion of shift register 40 to AND circuit 48. Thus, assuming a signal is also applied from address detector 46 to AND circuit 48, read generator 47 produces an output.

The final or "tag" core in field shift register 40 drives a code line driver 59 which applies the serial field message code to the code line as negative pulses, which are of proper polarity to be received by the office, but which are of the wrong polarity for the other field stations to receive. Since the field stations are responsive to positive pulses only, negative pulses produced from any individual field station are not detected by any of the other field stations.

When the "tag" bit of the field station message arrives in the final bit position of the office shift register of FIG. 1A, the office puts a positive pulse on the code line, thus placing the field transmit flip-flop circuit in the OFF, or cease transmission condition. This restores the field station to its receive mode, and provides an indication at the field station that the message has been received by the control office.

In operation, assume a message is to be transmitted from the control office of FIG. 1A to the field station of FIG. 1B, which is to position the utilization means of FIG. 1B to a new condition. Assume the field station of FIG. 1B is designated station A. A code is established in station A code read-in circuit 11 of FIG. 1A containing the message for station A. By activating this read-in circuit, the address for station A is automatically established in shift register 10, since each station code read-in circuit carries its own address which, upon activation, is read into the shift register.

Activation of the station A code read-in circuit causes parallel transfer of the code therefrom into shift register 10. Simultaneously, office transmit flip-flop circuit 19 is turned ON, locking the office equipment in the transmit code so as to prevent the office-initiated message from being treated by the office as a message which has been received from a field station. This result is achieved by locking out code input driver 21, thereby preventing any serial code read-in to shift register 10.

Advance driver 18 causes the message read into shift register 10 from station A code read-in circuit 11 to shift from one row of magnetic core storage units in the shift register to the other row of magnetic core storage units, in characteristic alternate fashion through the shift register. As the coded information is alternately shifted through the register, it is serially read out of the final core in the shift register and coupled through code line driver 15 to the code line. The pulses transmitted from driver 15 are not detected by receiving amplifier 16, since this amplifier is responsive to negative pulses only, while the control office transmits only positive pulses.

The coded information is received by all field stations coupled to the code line, thereby assuring that all field transmit flip-flop circuits 56 in the field stations are OFF, preventing the field stations from transmitting. Simultaneously, the code is serially read into shift register 40 through code input driver 44. Advance driver 41 causes the code to shift alternately from one row of magnetic core storage units on one side of the shift register to the other row of magnetic core storage units in alternate fashion and thus serially fill the shift register in the manner common to shift registers in general. Filling of shift register 40 occurs in step with the emptying of shift register 10, since advance drivers 18 and 41 are both driven from the common clock line.

When the "tag" bit arrives at the final bit position in shift register 40, the address is decoded in address detector 46. If the received message is intended for this field station, the address detector provides a first input to AND circuit 48. A second input to AND circuit 48 is simultaneously provided through gated amplifier 58 from the "tag" bit in shift register 40, since the gated amplifier is in its conducting condition due to absence of a signal from transmit inhibit amplifier 57. Thus, read generator 47 is triggered, clearing message storage unit 49, and subsequently causing transfer of coded information from shift register 40 into message storage unit 49 upon occurrence of the next even pulse from the advance driver. When the message is received by message storage unit 49, utilization means 52 are actuated.

In the event the received message were not intended for this field station, address detector 46 would not have provided one of the two necessary inputs for AND circuit 48. Thus, read generator 47 would not have been triggered, and no change in the message stored in message storage unit 49 would have occurred. The message storage unit would thus have retained the message previously received from the office.

After the utilization means have operated, a new code corresponding to the new condition of the utilization means, which in turn should correspond to the code transmitted from the office, is applied to shift register 40. This can be accomplished since shift register 40 is cleared when its coded information is transferred into message storage unit 49. After an interval of sufficient duration to permit operation of the utilization means, delay circuit 54 provides a signal to field input driver 55. This circuit then provides a signal to field transmit flip-flop 56, turning it ON, thereby producing a signal through transmit inhibit amplifier 57 which switches gated amplifier 58 into its non-conducting mode. It should be noted that during the interval in which the gated amplifier has been in its conducting mode, serial generator 60 was prevented from applying a serial prime signal to the magnetic cores of shift register 40. Thus, the serial prime signal can be applied to shift register 40 only during the interval in which coded pulses are received from the office. This feature permits serial read-in of received coded information to shift register 40. The serial prime signal comprises a steady direct current which is turned OFF when the "tag" bit arrives at the final bit position in shift register 40, and is reset by an even pulse output from amplifier 42. The "tag" bit also returns a single negative pulse to the control office, turning office flip-flop 19 OFF. Clock line pulses are applied as a reset signal to serial generator 60 through phase-inverting amplifier 42.

When the field transmit flip-flop is turned ON, field input driver 55 couples energy through the utilization means to the shift register. This causes information responsive to condition of the utilization means to be set into the shift register. The advance driver then produces searial readout of the information applied to the shift register, which is coupled to the code line through code line driver 59 in the form of pulses and transferred back to the office.

In the event the utilization means fail to operate in accordance with the received message, the information transferred back to the control office corresponds to the erroneous condition of the utilization means. The erroneous condition can then be discovered at the office by visual inspection of the station A code indicator, and the proper code may then be retransmitted to field station A, or any other necessary steps to correct the erroneous condition may be taken. The sequence by which a field station condition indication is transferred to a field station code indicator at the control office is described below.

Pulses received at the control office of FIG. 1A from any individual field station are coupled through receiving amplifier 16 to the office transmit flip-flop circuit through an amplifier 26. The flip-flop circuit is meanwhile in its OFF condition, to which it was switched when the "tag" bit arrived at its final bit position in field shift register 40. Transmit inhibit amplifier 20, while remaining in its OFF condition, deactivates station activator 14, preventing a new control code from being applied to the shift register of the control office. In addition, transmit inhibit amplifier 20 activates code input driver 21, permitting operation of the driver from receiving amplifier 16. Thus, received negative pulses from the transmitting field station in response to a message originally transmitted from the control office are applied from the code line through amplifier 16 and code input driver 21 into shift register 10 in serial fashion.

When the "tag" bit of the incoming message reaches the final magnetic core in shift register 10, AND circuit 22 receives an input from the shift register and a second input from transmit inhibit amplifier 20. This triggers read-serial generator 23 to produce parallel readout of the information stored in the shift register to message storage unit 24 and address storage unit 25, and to produce a single positive pulse from the final bit position in shift register 10 for transmission to the selected field station, switch field station flip-flop 56 to its OFF condition.

When an address is stored in address storage unit 25, it is applied to address decoder 27 which determines what field station has originated the message. The address decoder then initiates clearing of the station code indicator holding the previously received message from the field station sending the present message and subsequently triggers the message storage unit, causing transfer of the message stored therein to the proper station code indicator which has been cleared; in this instance, station A code indicator 28.

Cessation of received field pulses assures that the OFF signal from office transmit flip-flop circuit 19 has been removed by the signal from field shift register 40 when the "tag" bit reached the final bit position in the field shift register. This permits application of a new ON signal to the flip-flop circuit, permitting a new control code to be transmitted by the office.

In the event it is desired that continuous, repetitive signals requiring a separate response to each signal from the receiving field station may be coupled to the office station activator so as to trigger the station activator each time a signal is received at the office. The station code read-in circuit for the receiving field station thereby continuously provides a signal for the control office which is coupled to the office shift register each time it is activated by the station activator.

Figure 2:
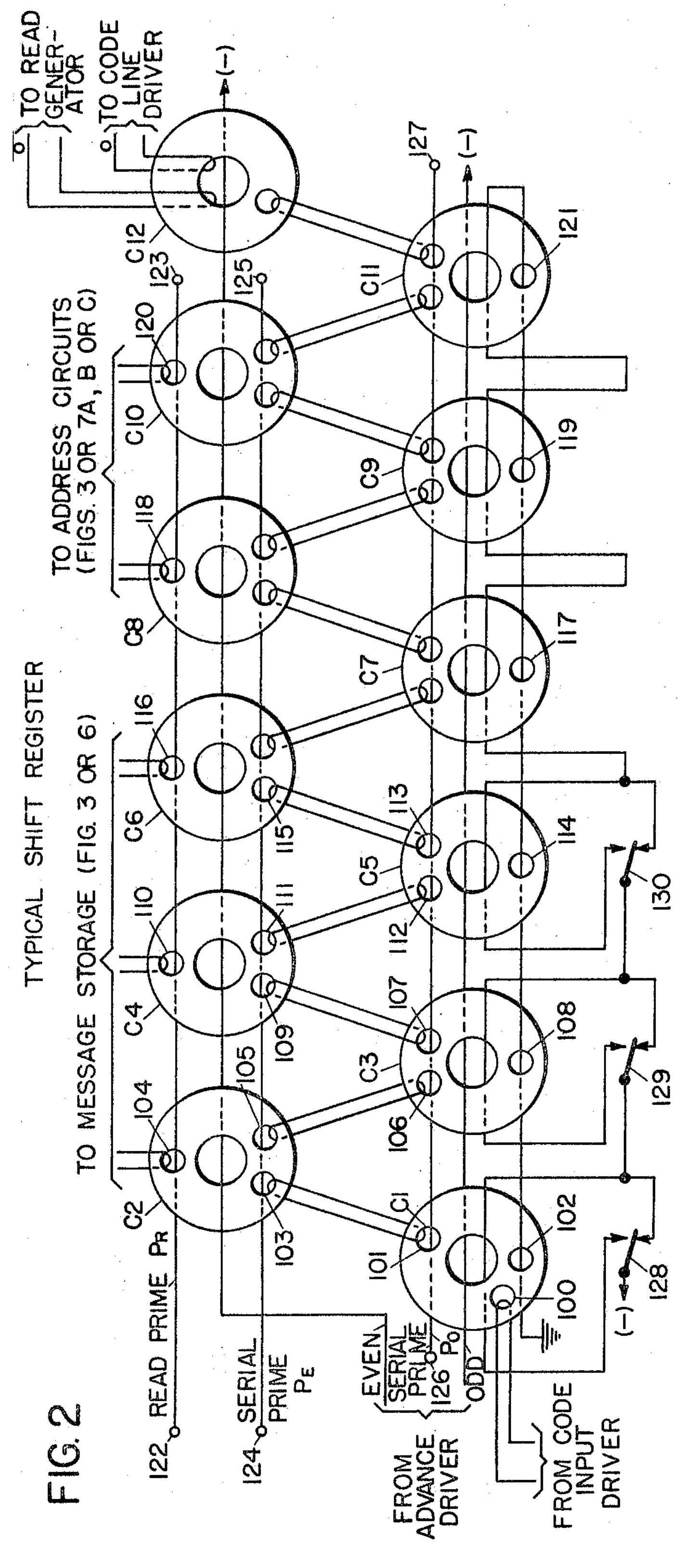
FIG. 2 is a simplified schematic diagram of a typical shift register used either at a field station or the control office.

Turning now to FIG. 2 there is shown a schematic diagram of a typical shift register in simplified form, which may constitute the shift register utilized in either the control office or field stations. The shift register comprises a plurality of multiaperture magnetic cores, designated C1–C12. The odd-numbered cores are arranged in a first row which is cleared by the advance driver of the office or field station, depending upon where the shift register is installed, with off pulses from the advance driver. The even-numbered cores are arranged in a second row which is cleared by the even pulses produced from the advance driver. The advance driver produces odd and even pulses alternately.

Serial read-in to the shift register is achieved by setting the first core C1 through an input minor aperture 100. Simultaneously, a serial priming signal $P_O$ is applied through an output minor aperture 101. When the advance driver next produces an odd pulse, core C1 is cleared, producing an output pulse from minor aperture 101 which is coupled to an input minor aperture 103 of core C2, thereby setting core C2. An output minor aperture 105 of core C2 is thereupon primed by a serial priming signal $P_E$. An even pulse is then produced from the advance driver, clearing core C2 and causing transfer of a pulse from output minor aperture 105 to an input minor aperture 106 of core C3, setting the core. It should here be noted that the initial set pulse applied to core C1 is designated the "tag" bit; that is, this signal is always a set pulse.

With the "tag" bit now stored in core C3, a new signal is produced from the code input driver which may be either a binary ONE or ZERO, depending upon the signal from the distant transmitting station. If the code input signal is a binary ONE, core C1 again becomes set, while if the input signal is a binary ZERO, core C1 remains clear. Thereafter, an odd pulse is produced from the advance driver, transferring information from cores C1 and C3 to cores C2 and C4, respectively. Core C4 now contains the "tag" bit while core C2 contains either a ONE or a ZERO, depending upon whether core C1 was set or clear at the time an odd pulse was previously produced from the advance driver. The next seven pulse from the advance driver transfers the information stored in cores C2 and C4 to cores C3 and C5, respectively. A new signal is again applied to core C1 at this time, and subsequently the information stored in cores C1, C3 and C5 is transferred to cores C2, C4 and C6, respectively, upon occurrence of an odd pulse from the advance driver. This process continues until the tag bit reaches core C12.

When an odd pulse produced from the advance driver causes the "tag" bit to transfer from core C11 to core C12, outputs are produced from the major aperture of core C12 to the read generator and code line driver circuits. These outputs occur before a new even pulse is produced from the advance driver, since the aforementioned windings are connected so as to sense the set condition of the core, rather than produce a usable output upon the clearing thereof. Although an output is produced upon clearing of the core, it is of the wrong polarity, and thus is not used. Thus, prior to occurrence of the next even pulse from the advance driver, a read prime current $P_R$ is coupled through output minor apertures 104, 110, 116, 118 and 120 of cores C2, C4, C6, C8 and C10, respectively. Upon occurrence of the next following even pulse from the advance driver, information is read from cores C2, C4 and C6 to a message storage unit, and from cores C8 and C10 to address circuits. This demarcation between message and address circuits is dependent upon the number of bits utilized for address information and the number of bits utilized for message information. For illustrative purposes, it is herein assumed that the second and third bits contain address information while the third, fourth and fifth bits contain message information. Obviously, the system can be expanded to accommodate many address bits and many message bits, depending upon requirements of the system.

Serial readout of the shift register is initiated by sensing the condition of core C12 through a code line driver coupled to the code line. Thus, if core C12 is in the set condition, a "tag" pulse is coupled to the code line driver upon occurrence of the next even pulse from the advance driver. This is because core C12 contains the "tag" bit, which is always a binary ONE. The "tag" pulse coupled to the code line driver is then transferred over the code line to the message originating station, indicating that the original message has reached the receiving station shift register. Moreover, upon occurrence of this next even pulse, information stored in cores C2, C4, C6, C8 and C10 is transferred to cores C3, C5, C7, C9 and C11, respectively. Since reception from a distant location cannot now occur, as previously described in conjunction with system operation, no pulse is coupled to core C1 during the interval between the even pulse which has just occurred and the odd pulse which is about to occur. Thus, upon occurrence of the next odd pulse, information stored in cores C3, C5, C7, C9 and C11 is transferred to cores C4, C8, C10 and C12, respectively. Core C2 remains clear, since no information was previously coupled to core C1. The code line driver then responds to the condition of core C12, and transmits either a binary ONE or ZERO, depending upon whether core C12 is presently set or clear. On the next following even pulse, information stored in cores C4, C6, C8 and C10 is transferred to cores C5, C7, C9 and C11 respectively, and so on.

The pairs of terminals for prime signals $P_R$, $P_E$ and $P_O$ are designated 122 and 123, 124 and 125, and 126 and 127, respectively. Additional windings are coupled through the major apertures of the odd-numbered cores to provide a second means for reading information into the shift register. Received messages are serially read into the shift register, while messages to be transmitted are read into the shift register in parallel fashion. For example, a group of switches 128, 129 and 130 are utilized in conjunction with message cores C1, C3 and C5, respectively. These switches need not necessarily be switch contacts; that is, they may be relay contacts, or other contacts operated by transducer means. Closing of any of these front contacts produces inner leg setting of the core associated with that front contact, while closing of the back contact associated with the core leaves the core in the clear condition. In order to achieve inner leg setting of the cores, the return for these major aperture windings is brought back through minor apertures 121, 119, 117, 114, 108 and 102 of cores C11, C9, C7, C5, C3 and C1 respectively.

No contacts are associated with cores C7, C9 and C11. This is to permit a number of set windings to be coupled through the major apertures of the latter cores, in order to accommodate a separate message for any desired receiving station. The circuit of FIG. 2 permits a message to be sent only to a single receiving station, whose coded address must be ONE ONE. To establish a message for a second receiving station, a second set of contacts would have to be coupled to cores C1, C3 and C5 through the major apertures, with each core associated with a new front and back contact. These windings might then be coupled to cores C7 and C9 in binary fashion so as to produce a ZERO ONE as the address. This can be achieved bypassing the major aperture of code C7 and coupling a set winding through the major aperture of cores C9 and C11 only. Thus, energization of this second set of additional windings through the major apertures of the odd-numbered cores can permit establishment of a second message which would be transmitted to the station whose address was ZERO ONE. Core C11 would have to be set also, since it carries the "tag" bit. In similar fashion, other codes can be established by parallel reading to the odd-numbered cores of the shift register.

In subsequent discussion, prime currents through the office shift register will be suffixed by the subscript O, while prime currents through a field shift register will be suffixed by the subscript S. For example, $P_{RO}$ represents the read prime signal in the office shift register which $P_{RS}$ represents the read prime signal in the field shift register.

Figure 3:
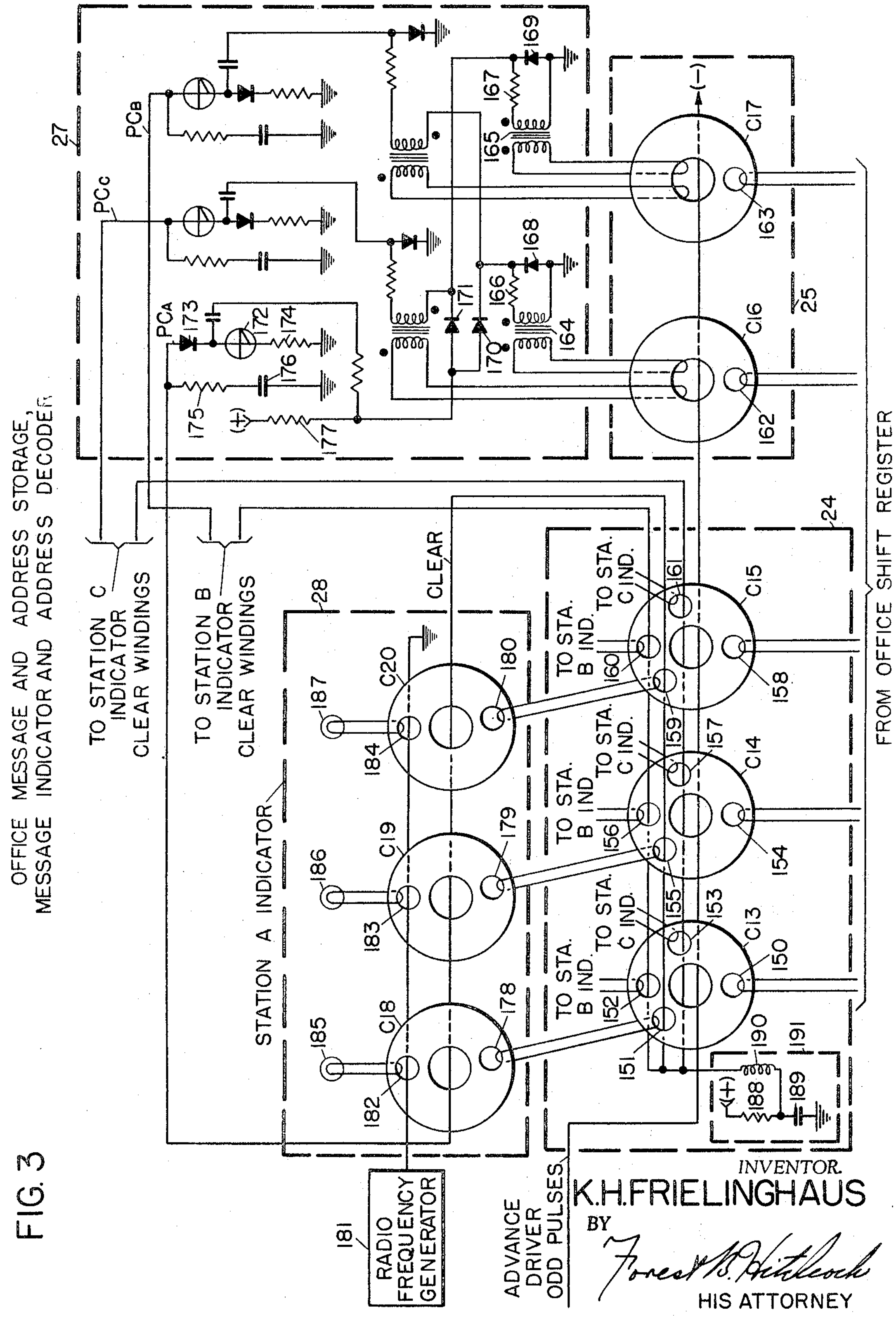
FIG. 3 is a schematic diagram of the control office message and address storages, message indicator for a single field station and address decoder circuits used in the block diagram of FIG. 1A.

FIG. 3 shows in schematic form office message storage unit 24, address storage unit 25, station A code indicator 28 and address decoder 27 shown in block diagram form into FIG. 1A. Message storage unit 24 comprises a group of cores C13, C14 and C15. Input minor apertures 150, 154 and 158 of respective cores C13, C14 and C15 are coupled to output minor apertures 104, 110 and 116 of cores C2, C4 and C6, respectively, shown in FIG. 2. Transfer of information from cores C2, C4 and C6 occurs when read priming signal $P_{RO}$ is coupled thereto and subsequently an even pulse from advance driver 18 of FIG. 1A is coupled through the major apertures of cores C2, C4 and C6.

Address storage unit 25 comprises a pair of cores C16 and C17, coupled respectively to cores C8 and C10 of FIG. 2. Thus, when the read prime current $R_R$ is coupled through minor apertures 118 and 120 of cores C8 and C10, and the address is temporarily stored in the latter cores, occurrence of the next following even pulse from advance driver 18 causes transfer of the address information to cores C16 and C17 through their respective input minor apertures 162 and 163.

Assuming that the control office is receiving from field station A, both cores C16 and C17 are set through their input minor apertures 162 and 163. This condition is sensed through a pair of transformers 164 and 165 respectively coupled to the major apertures of cores C16 and C17. The transformers are of a type which produces only very slight distortion of short duration pulses. The secondary windings of transformers 164 and 165 each have a resistor 166 and 167 respectively, coupled to the ± terminal thereof, designated by a dot, and a diode 168 and 169, respectively, connected in the forward direction from the other secondary terminal to the opposite side of the resistor. The cathode terminal of diode 168 is coupled to the cathode terminal of a diode 170 while the cathode terminal of diode 169 is coupled to the cathode terminal of a diode 171. The anode terminals of diodes 170 and 171 are joined together and coupled to a source of positive voltage through a voltage dropping resistor 177. It should now be obvious to those skilled in the art that the junction common to the anodes of diodes 170 and 171 provides the output of an AND circuit, the inputs of which are coupled to the primary windings of transformers 164 and 165.

The anodes of diodes 170 and 171 are RC coupled to a point common to the anode of a four-layer diode 172 and a diode 173. The cathode of four-layer diode 172 is grounded through a resistor 174 while the anode of diode 173 is grounded through a series-connected resistor 175 and capacitor 176. A prime current $PC_A$ is coupled from a positive voltage source through an RLC pulse shaping network 191 comprising a resistor 188, capacitor 189 and inductor 190, through output minor apertures 151, 155 and 159 of cores C13, C14 and C15 respectively, through the major apertures of a group of cores C18, C19 and C20 utilized in station A code indicator 28, to the anode of diode 173. Outputs from minor apertures 151, 155 and 159 of cores C13, C14 and C15, respectively are coupled to respective input minor apertures 178, 179 and 180 of cores C18, C19 and C20, respectively. Radio frequency energy from a generator 181 is coupled through output minor apertures 182, 183 and 184 of cores C18, C19 and C20, respectively, through which are also coupled lamps 185, 186 and 187, respectively. These lamps are responsive to radio frequency energy and provide visual indication of the message stored in station A code indicator 28.

In operation, assuming information is stored in cores C13–C17, and assuming the address stored in cores C16 and C17 is that which selects field station A, the set condition of cores C16 and C17 produces positive voltages on the cathodes of diodes 170 and 171, thereby halting current flow through these diodes and through dropping resistor 177. This produces a sudden rise in voltage on the anode of four layer diode 172 and cathode of diode 173. However, the voltage on the anode of diode 173 remains substantially constant, since it is coupled to the prime current supply voltage through RLC filter 191. The increased voltage across four-layer diode 172 causes the diode to suddenly switch into forward conduction. Resistor 174 limits current flow through the four-layer diode to a safe value. Due the slow rise of current through indicator 190, capacitor 176 provides holding current for diode 172 through current limiting resistor 175 until current through inductor 190 builds up to an amplitude above diode 172 holding current amplitude. When the four-layer diode conducts, current passes from pulse shaping network 191 through output minor apertures 151, 155 and 159 of cores C13, C14 and C15, priming these apertures. In addition, this current is also passed through the major apertures of cores C18, C19 and C20, thereby clearing all information from these cores.

After an interval determined by the discharge time of capacitor 189 in pulse shaping network 191, insufficient current is coupled through four-layer diode 172 to maintain the diode in conduction. Thus, when forward current through the four-layer diode falls below the holding current, the diode turns off and reverts to its high resistance or blocking state. This removes prime current from cores C13, C14 and C15, and also removes clear current from cores C18, C19 and C20. Timing of the four-layer diode conduction period is set so that the diode conducts and reverts to its blocking state during the interval subsequent to occurrence of an even pulse and prior to occurrence of the next following odd pulse produced from the office advance driver.

Upon occurrence of the next odd pulse produced from the office advance driver following the priming of cores C13, C14 and C15 and the clearing of cores C18, C19 and C20, cores C13–C17 are cleared. Those of cores C13, C14 and C15 which are set then transfer set pulses to the cores of the station A code indicator coupled thereto. For example, if cores C13 and C15 were set and core C14 were clear, indicating a binary ONE ZERO ONE message has been received from field station A, cores C18 and C20 are set through their input minor apertures 178 and 180 respectively, upon occurrence of the odd pulse from the office advance driver, while core C19 remains clear. Thus, lamps 185 and 187 become lit with radio frequency energy inductively coupled thereto from radio frequency generator 181, while lamp 186 remains unlit.

In similar fashion, priming currents for cores C13–C15 to produce indications of messages received from stations B and C are also provided through utilization of four-layer diodes. In this instance however the four-layer diodes for producing prime signals indicative of receipt of messages from stations B or C are triggered by the set condition of cores C17 or C16, respectively. It is therefore obvious that with a two-bit address, the station A code indicator is operated from an AND circuit responsive to the set condition of cores C16 and C17, the station B code indicator is operated from an EXCLUSIVE OR circuit responsive to the set condition of core C17 and the station C code indicator is operated from an EXCLUSIVE OR circuit responsive to the set condition of core C16 only. Obviously, the system can be expanded; for example, a three-bit address would permit indications from seven stations rather than three, as is characteristic of binary coding.

Figure 4:
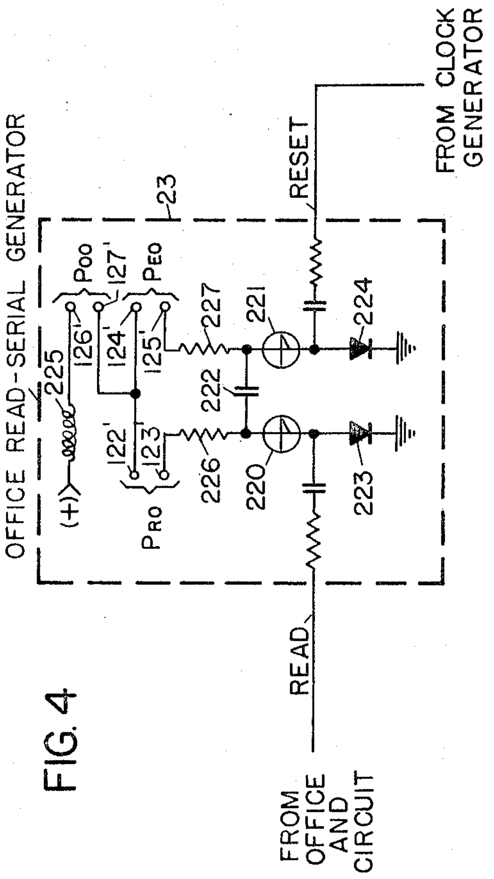
FIG. 4 is a schematic diagram of the office read-steer generator used in FIG. 1A.

FIG. 4 is a schematic diagram of a typical circuit for the office read-serial generator 23 of FIG. 1A. The anodes of a pair of four-layer diodes 220 and 221 are coupled to each other through a capacitor 222. The cathodes of four-layer diodes 220 and 221 are respectively coupled to ground through forward-connected diodes 223 and 224, respectively. Office shift register serial prime current $P_{OO}$ is provided from the positive side of the office power supply through a pulse shaping indicator 225 through terminals 126′ and 127′. These terminals are coupled to correspondingly numbered terminals 126 and 127 of the shift register illustrated in FIG. 2. Prime current $P_{OO}$ is then coupled through four-layer diode 220 through a series-connected resistor 226 and a pair of terminals 122′ and 123– for applying office shift register read prime current $P_{RO}$ to the shift register of FIG. 2 through correspondingly numbered terminals 122 and 123 of FIG. 2, or through four-layer diode 221 through a series connected resistor 227 and a pair of terminals 124′ and 125′ for applying office shift register serial prime current $P_{EO}$ to correspondingly numbered terminals 124 and 125 of FIG. 2. A read signal is RC coupled to the cathode of four-layer diode 220 from the office AND circuit 22 shown in FIG. 1A, while a reset condition is series RC coupled to the cathode of four-layer diode 221 from the clock generator 17 of FIG. 1A.

When information is being serially transferred into or out of the shift register of FIG. 2, the read connection to read-serial generator 23 is deenergized. This is obvious from the fact that when information is being transferred into office shift register 10 of FIG. 1A, no "tag" bit is present in the final core C12, shown in FIG. 2. On the other hand, when information is being serially transferred from the office shift register, AND circuit 22 of FIG. 1A produces no output since no signal is coupled thereto from transmit inhibit amplifier 20. However, as can be seen in FIG. 2, each even pulse produced from the clock generator momentarily drives the cathode of four-layer diode 221 in a negative direction so that the voltage across diode 221 momentarily exceeds its breakover value. This causes conduction through the four-layer diode. When the even pulse from the clock generator ceases, four-layer diode 221 continues to conduct through resistor 227, since the amplitude of current flow through this resistor is above the holding current value for the four-layer diode. In this manner, conduction of four-layer diode 221 produces office shift register serial prime currents $P_{OO}$ and $P_{EO}$.

Conduction through four-layer diode 221 causes capacitor 222 to acquire a charge through resistor 226 and four-layer diode 221. The charging current for the capacitor is below the necessary value for priming an output minor aperture of a multiaperture magnetic core, so that current drawn between terminals 122′ and 123′ is insufficient for priming output minor apertures 104, 110, 116, 118 and 120 of respective cores C2, C4, C6, C8 and C10 of the office shift register constructed in accordance with FIG. 2.

When both inputs are applied to the 2-input AND circuit 22 of FIG. 1A, a negative read voltage is applied to the cathode of four-layer diode 220. The voltage across diode 220 thus exceeds its requisite breakover value, causing it to conduct and consequently draw current through resistor 226, thereby providing office shift register read prime current $P_{RO}$. Simultaneously, conduction of diode 220 causes its anode voltage to approach ground potential. Since the voltage previously acquired on capacitor 222 cannot rapidly change, due to presence of resistors 226 and 227 coupled thereto, the anode voltage on four-layer diode 221 is also driven in a negative direction, to a point where the voltage across diode 221 is below the holding value of voltage for the diode. The diode then reverts to its blocking state. At this point, prime currents $P_{OO}$ and $P_{RO}$ flow through the office shift register, while prime current $P_{EO}$ is absent. The next even pulse applied from the clock circuit thus causes transfer of information stored in cores C2, C4 and C6 of the office shift register into the message storage of FIG. 3 and information stored in cores C8 and C10 of the office shift to the address circuits of FIG. 3. Simultaneously, this even pulse also resets the office read-serial generator by turning on four-layer diode 221 and thereby turning off four-layer diode 220, in a manner similar to that already described.

Figure 5:
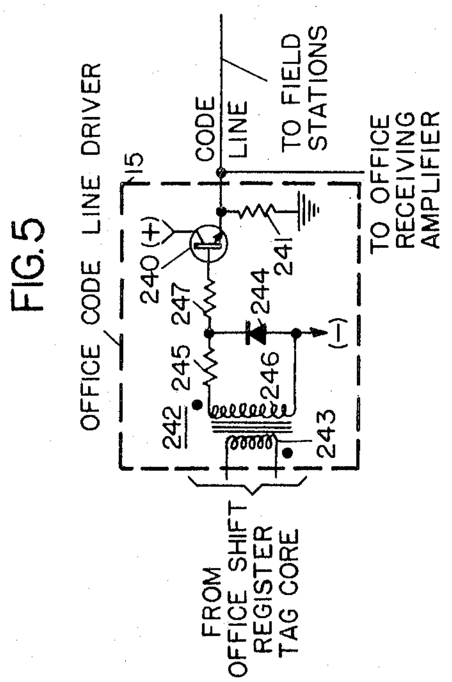
FIG. 5 is a schematic diagram of the office code line driver used in FIG. 1A.

FIG. 5 is a schematic diagram of the office code line generator 15 shown in block form in FIG. 1A. This circuit comprises an NPN transistor 240 with its collector coupled to the positive voltage source and emitter coupled to ground through an emitter bias resistor 241. The emitter is also coupled to the code line.

A transformer 242 of a type displaying good pulse handling characteristics, such as those transformers utilizing ferrite cores, has its primary winding 243 coupled through the major aperture of the office shift register final or "tag" core C12, for sensing a set condition thereof. A series-connected diode 244 and resistor 245 is shunted across the secondary 246 of transformer 242. Transformer ± terminals are indicated by dots, and the ± terminal of primary winding 243 is coupled to the lead so indicated in FIG. 2. The anode of diode 244 is connected to the negative terminal of the power supply, while the cathode of diode 244 is coupled to the base of transistor 240 through a base bias resistor 247. Thus, the office code line generator is seen to comprise an emitter-follower amplifier, transformer-coupled to the "tag" core of the office shift register for impedance matching purposes. Such amplifiers are characterized by high stability.

In operation, assume a set pulse is applied to the "tag" core of the office shift register. As explained in conjunction with FIG. 2, this condition is sensed by a winding through the major aperture of the "tag" core which is coupled to the primary winding 243 of transformer 242. The voltage pulse produced by the "tag" core when its condition is changed from clear to set thereby appears across secondary winding 246 of the transformer.

Resistor 245 in series with diode 244 forms a clipper circuit across secondary winding 246. Thus, when the "tag" core becomes set, the ± side of the secondary winding swings positive by an amount equal to the sum of the voltage across the secondary winding plus the negative voltage supply amplitude. Application of this positive voltage to the base of transistor 240 through series resistors 245 and 247 causes the transistor to conduct, producing a positive pulse across resistor 241 with respect to ground. This pulse is transmitted to the field stations coupled to the code line.

Although the code line is coupled to the input side of the office receiving amplifier 16, shown in FIG. 1A in block form, this amplifier is responsive only to negative pulses. One type of amplifier well suited for such purpose is an emitter-follower amplifier utilizing a PNP transistor. Such amplifier is driven into conduction only by negative base pulses and is not responsive to positive base pulses which merely drive the transistor into cutoff.

When the voltage across secondary winding 246 reverses polarity, so that the ± terminal swings negative, diode 244 conducts. Substantially all the secondary output voltage then appears across resistor 245. Under these conditions, transistor 240 is held in a nonconductive condition. The diode therefore provides a circuit path for short-circuiting oscillations due to overshoot of set pulses.

In the event a clear pulse produces a voltage across primary winding 243, the polarity of the pulse appearing across secondary winding 246 is identical to the overshoot polarity produced by a set pulse applied to the primary winding. Again, substantially all the transient current flow through the second winding is short-circuited through diode 244 and transistor 240 is quickly returned to its quiescent state. However, in the event no pulses are applied to transformer 242, transistor 240 is held in a non-conductive quiescent condition, due to application of negative voltage on the base through secondary winding 246 and series-connected resistors 245 and 247.

Figure 6:
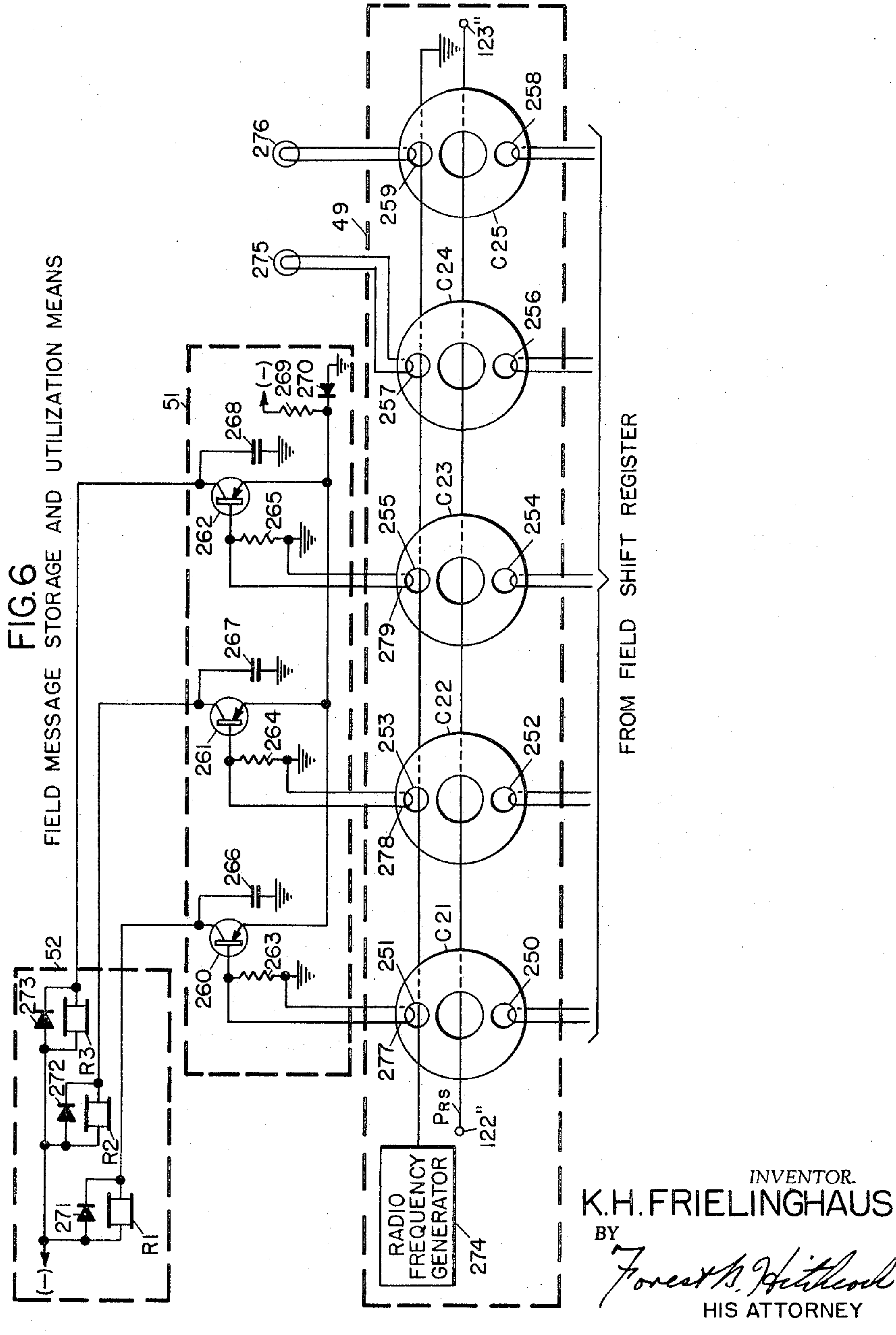
FIG. 6 is a schematic diagram of the field message storage and utilization means circuits used in the block diagram of FIG. 1B.

FIG. 6 is a schematic diagram of field message storage unit 49, amplifiers 51 and utilization means 52 shown in block form in FIG. 1B. The message storage unit comprises a group of multiaperture magnetic cores C21–C25, with respective input minor apertures 250, 252, 254, 256 and 258 coupled to the output minor apertures of cores C2, C4, C8 and C10 of the field shift register as illustrated in FIG. 2. Utilization means 52 is shown as a groups of relays R1, R2 and R3 responsive to the magnetic condition of cores C21, C22 and C23 respectively, through a group of parallel amplifiers 51, which comprises a group of transistors 260, 261 and 262. The bases of transistors 260, 261 and 262 are respectively coupled to output minor apertures 251, 253 and 255 of cores C21, C22 and C23, respectively through output windings 277, 278 and 279, respectively. Each of transistors 260, 261 and 262 has associated therewith a respective base input resistor 263, 264 and 265 across which input voltage to the respective transistor is applied, and a respective bypass capacitor 266, 267 and 268 for conducting undesired high frequency transient currents to ground.

The collector of each transistor is coupled to a separate relay for control thereof. Thus, the collector of transistor 260 is coupled to relay R1, the collector of transistor 261 is coupled to relay R2 and the collector of transistor 262 is coupled to relay R3. The base of each transistor is biased at ground potential through the multiaperture core output winding coupled thereto. Negative bias is coupled to the emitters of the transistors from a voltage divider circuit comprising a series-connected resistor 269 and diode 270. Forward voltage drop across the diode provides the emitters with a constant bias regardless of the number of transistors conducting at any given instant since the diode is operated on the flat portion of its forward current characteristic curve. This small negative emitter bias is of sufficient amplitude to maintain the transistors in an off condition regardless of spurious small amplitude noise signals produced from the magnetic cores coupled thereto, without affecting their response to switching of the cores. This can readily be seen from the fact that since the base of each transistor is at ground potential while the emitter of each transistor is biased negatively, the base of each transistor is positive with respect to its emitter.

Each of relays R1, R2 and R3 comprising utilization means 52 has shunted across its coil a diode 271, 272 and 273, respectively. These diodes are polarized in a direction to provide slow dropaway, of any relay upon deenergization. Thus, if a particular relay is energized at the time a new code is received by the field station calling for energization of that same relay, the interval between clearing of the cores in message storage unit 49 and filling the cores with the newly received code is not sufficient to permit the aforementioned relay to deenergize and again energize; that is, the relay remains in its picked-up condition during this interval. Thus, if a new signal is received by the field station which is identical to the code already stored therein, there is no change in the condition of the relays in the utilization means. No change is then detected at the field station.

It should be noted that cores C21–C25 are cleared through their major apertures by coupling field shift register read prime current $P_{RS}$ therethrough. Thus, a clear winding having terminals 122‴ and 123‴ is passed through the major apertures of cores C21–C25 with terminals 122‴ coupled to terminals 123 of the field shift register as illustrated in FIG. 2 and terminal 123‴ coupled to a terminal 123″ of the field read and serial generators, illustrated in FIG. 8.

A radio frequency generator 274 provides radio frequency energy through the output minor apertures of cores C21–C25. When core C21, C22 or C23 is set, radio frequency energy is inductively coupled to the base of the transistor associated therewith. It should be noted however that a lamp 275 is coupled through output minor aperture 257 of core C24, while a lamp 276 is coupled through output minor aperture 259 of core C25. Either of these lamps is lit when the core coupled thereto is in the set condition.

It should also be noted that contacts 128, 129 and 130 of the field shift register as shown in FIG. 2 are driven from respective relays R1, R2 and R3. Thus, in the field shift register, codes are applied in parallel thereto, in accordance with condition of the utilization means.

In operation, assume a message is received at the field station from the control office, and the received coded information has entirely filled the field shift register. This causes flow of read prime current $P_{RS}$ which simultaneously clears cores C21–C25 and primes cores C2, C4, C6, C8 and C10 of the field shift register. Occurrence of the next pulse from the field advance driver 41, which is an even pulse, clears cores C2, C4, C6, C8 and C10, causing transfer of information stored therein to cores C21, C22, C23, C24 and C25, respectively. Information as to positioning the utilization means is contained in cores C21, C22 and C23, while information transmitted for the purpose of providing visual information to a field station operator is contained in cores C4 and C25.

In the event a core in the group comprising cores C21–C23 is set, a signal is applied to the base of the transistor coupled thereto, causing energization of the relay coupled to the collector of the energized transistor. This relay then closes its front contact which is coupled to one of the cores in the field shift register, setting that core. In this fashion, information as to the new position of the utilization means is applied to the field shift register. In addition, information desired to be transmitted visually to the field station operator is indicated by a lighted lamp coupled to a set core in the group of cores comprising cores C24 and C25.

Figure 7C:
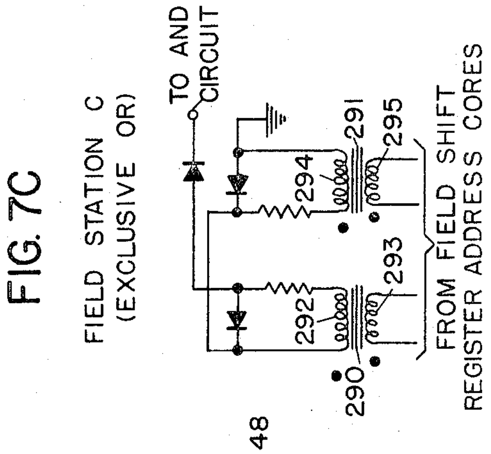
FIGS. 7A, 7B and 7C are schematic diagrams of the field address detector used in FIG. 1B, connected in different logical configurations for permitting selection of specified field stations from the control office.
Figure 7B:
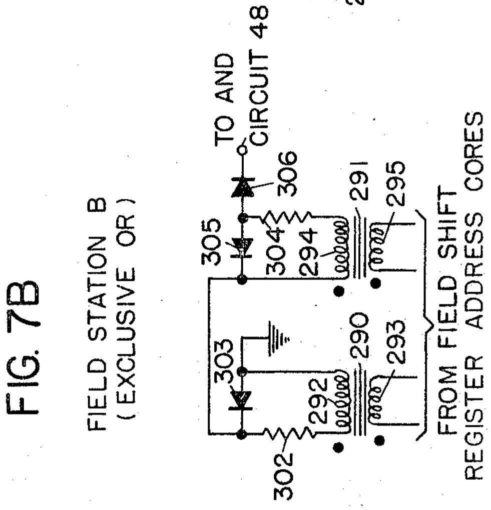
Figure 7A:
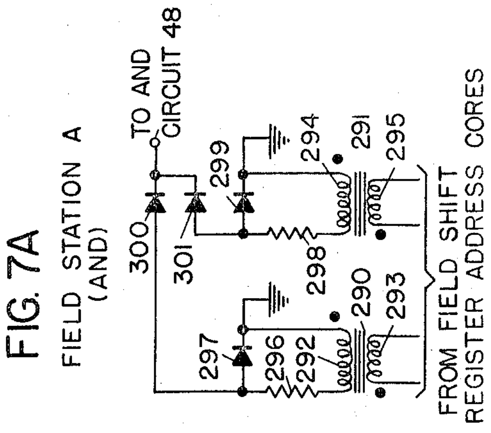

FIGS. 7A, 7B and 7C are schematic diagrams of different connections for the address detector 46 of the field station, shown in block diagram form in FIG. 1B. Thus, a pair of ferrite core transformers 290 and 291 have their respective primary windings 293 and 295 coupled to output minor apertures 118 and 120 of cores C8 and C10 respectively, of the field shift register, as illustrated in FIG. 2, for detecting the magnetic condition thereof. Polarity of connections is indicated by dotted ± terminal markings.

FIG. 7A illustrates an AND circuit which requires that both cores C8 and C10 be set in order for the field station to be actuated by an office-originated message. Coupled across secondary winding 292 are a series-connected resistor 296 and 297, with the ± terminal of secondary 292 coupled to the cathode of diode 297. Similarly, coupled across secondary winding 294 are a series-connected resistor 298 and diode 299, with the cathode of diode 299 coupled to the ± terminal of secondary 294. The anode of an AND circuit diode 300 is coupled to the anode of diode 297, while the anode of another AND circuit diode 301 is coupled to the anode of the diode 299. The cathodes of diodes 300 and 301 are coupled together and provide an input to AND circuit 48 of FIG. 1B.

Figure 8:
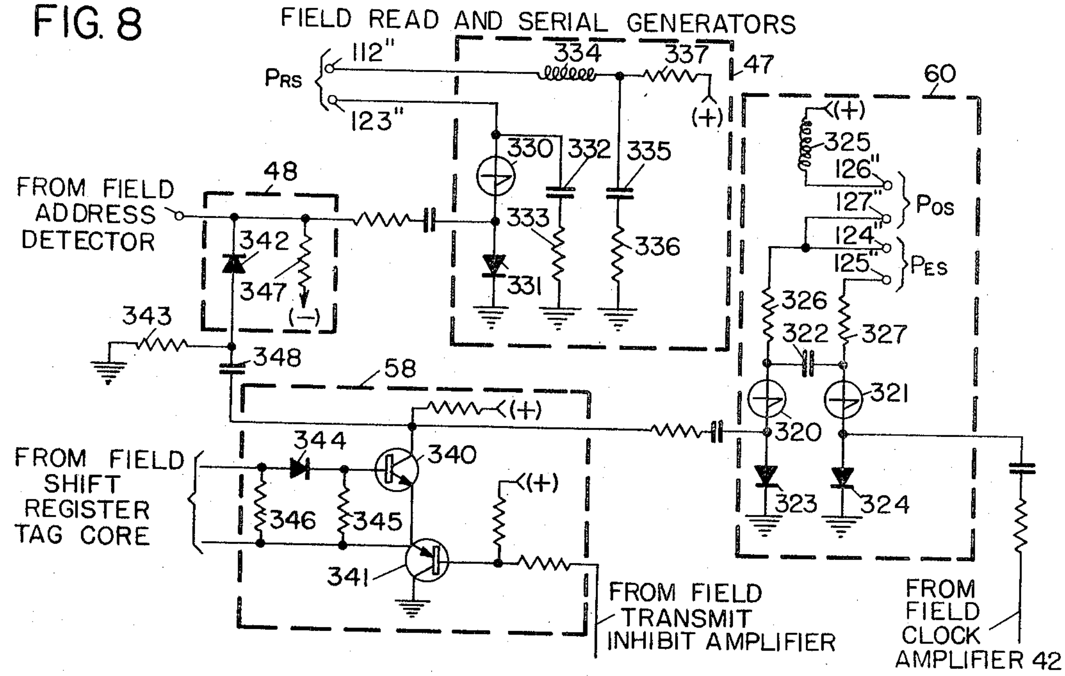
FIG. 8 is a schematic diagram of the field read and stear generator circuits used in FIG. 1B.

In operation, if the ± terminal on either secondary winding is negative, the anode potential of the diode coupled across the secondary, swings positive, causing current flow through an AND circuit diode coupled thereto. This is because AND circuit 48 is biased negatively. This secondary winding polarity is sensed by the AND circuit as being a lack of input. Obviously, this condition would also be sensed as a lack of input if the ± terminal of both secondary windings were to swing negative. On the other hand, if both ± terminals on the secondary windings are positive, the anodes of AND circuit diodes 300 and 301 are both driven to a negative potential. This halts current flow through both AND circuit diodes so that the input to AND circuit 48 from diodes 300 and 301 is now considered to be present. It should here be noted that this condition occurs when cores C8 and C10 are set; that is, their ± terminals on the primary windings of transformers 290 and 291 each receive a positive voltage pulse when the aforementioned cores are set. A schematic diagram of AND circuit 48 is illustrated in FIG. 8.

FIG. 7B is a schematic diagram of a field address detector located at a second field station, such as field station B, which comprises an EXCLUSIVE OR circuit. This circuit is responsive only to a clear condition of core C8 and set condition of core C10. In this circuit a series-connected resistor 302 and diode 303 are connected across the secondary winding 292 such that the resistor is coupled between the ± terminal of the secondary winding and the cathode of diode 303. Similarly, a series-connected resistor 304 and diode 305 are coupled across secondary winding 294 such that the cathode of diode 305 is coupled to the ± terminal of the secondary winding and the anode of the diode is coupled to the resistor. The cathodes of diodes 303 and 305 are coupled together. The anode of diode 303 is grounded and the anode of diode 305 is coupled to the anode of an AND circuit diode 306, the cathode of which is coupled to AND circuit 48.

In operation, assume core C10 is in the set condition and core C8 is in the clear condition. Under these circumstances, the ± terminal of secondary winding 294 is positive and the ± terminal of secondary winding 292 is negative. The cathode of diode 303 is thus at a potential below that of ground, thereby holding the cathode of diode 305 below ground potential also. Since the cathode of diode 305 is coupled to the positive side of secondary winding 294, the anode of diode 305 is more negative than the cathode. Thus, diode 306 is back-biased to a potential which halts current flow to AND circuit 48. This condition is sensed as an input to the AND circuit. However, it should be noted that if either core C8 is set or core C10 is clear, the voltage on the anode of diode 306 will become more positive, causing current flow to AND circuit 48 and thereby removing an input from the AND circuit.

FIG. 7C is a schematic diagram of an EXCLUSIVE OR circuit for detecting only a set condition of core C8 and clear condition of core C10. It will be noted that this circuit is simply a reversed version of the circuit shown in FIG. 7B, and operates similarly.

FIG. 8 is a schematic diagram of field read generator 60 and field serial generator 47 shown in FIG. 1B, with connections to AND circuit 48 and gated amplifier 58. Basically, the circuitry of serial generator 60 is similar to the circuitry of the office read-serial generator shown in FIG. 4. Thus, a pair of four-layer diodes 320 and 321 are coupled from their respective cathodes to the anodes of a pair of diodes 323 and 324, the cathodes of which are grounded. The anodes of the four-layer diodes are coupled together through a capacitor 322. The anodes of four-layer diodes 320 and 321 are respectively coupled to a pair of resistors 326 and 327, the other sides of which are respectively coupled to a pair of output terminals 124″ and 125″. These terminals are connected to correspondingly numbered terminals 124 and 125 of the field shift register, for supplying serial prime current $P_{ES}$ thereto. Terminal 124″ is coupled to an output terminal 127″, while a pulse-shaping inductor 325 is coupled between the positive side of the power supply and an output terminal 126″. Output terminals 126″ and 127″ are coupled to correspondingly numbered terminals 126 and 127 of the field shift register, for supplying serial prime current $P_{OS}$ thereto.

Read prime current $P_{RS}$ is supplied to the field shift register from read generator 47 through a pair of output terminals designated 122″ and 123″ which are connected respectively to terminals 122 of the field shift register and 123‴ of the field message storage circuit. The read generator comprises a single four-layer diode 330 coupled to the anode of a diode 331, the cathode of which is grounded. The anode of four-layer diode 330 is coupled to output terminal 123″. A series-connected capacitor 332 and resistor 333 is shunted across the series combination of four-layer diode 330 and diode 331. Output terminal 122″ is coupled to a pulse shaping inductor 334, the other side of which is grounded through a series-connected capacitor 335 and resistor 336. Terminal 122″ is positively biased from the positive side of the power supply through a resistor 337 connected in series with inductor 334.

Gated amplifier 58 comprises complementary transistors 340 and 341 having their emitters coupled together. The base of transistor 341 receives signals from the field transmit inhibit amplifier shown in block form in FIG. 1B, while the collector of transistor 341 is grounded. The collector of transistor 340 is RC coupled to the cathode of four-layer diode 320. The collector of transistor 340 is also coupled to the anode of an AND circuit diode 342 through a capacitor 348, thereby providing a second input to AND circuit 48 which receives a first input from the field address detector shown in block form in FIG. 1B. A resistor 343 permits capacitor 348 to acquire a charge of either polarity, by providing a bidirectional current path to ground.

Input to transistor 340 is applied across the base and emitter terminals from the "tag" core of the field shift register. The input to transistor 340 is taken from a winding coupled through the major aperture of the "tag" core, which is responsive to the set condition of the core. A diode 344 is utilized in the base circuit of transistor 340 in order to assure that only voltages of the proper polarity are applied to the base of the transistor. Thus, unwanted pulses comprising transients produced when the "tag" core is set, and unwanted pulses due to clearing of the "tag"

core, are eliminated by use of the diode. A resistor 345 is coupled between the emitter of transistor 340 and the cathode of diode 344, while a resistor 346 is coupled between the anode of diode 344 and the emitter of transistor 340. Resistor 346 protects diode 344 by shunting large reverse voltages produced from the "tag" core, while resistor 345 provides base bias for transistor 340 and further limits the base to emitter voltage swing of the transistor.

AND circuit 48 is of conventional form in that unidirectional signals are applied to the circuit across a resistor 347, the other side of which is coupled to the negative side of the power supply. AND circuit output signals are RC coupled to the cathode of four-layer diode 330. Thus, when current flows into AND circuit 48 on either of its input leads, the current is coupled through resistor 347 to the negative side of the power supply, thereby providing a positive potential to the cathode of four-layer diode 330. This situation occurs whether input signals applied to the AND circuit originate from either field address detector 46 or gated amplifier 58, or both. However, when no signal are applied to the AND circuit from both the field address detector and field gated amplifier, no current flows through desistor 347. This produces a sudden drop in voltage at the cathode of four-layer diode 330 to a value, causing the voltage across the four-layer diode to exceed its breakdown amplitude. The four-layer diode thus begins conduction, producing the read prime current $P_{RS}$ which is applied to the field shift register.

It should be noted that when read prime current $P_{RS}$ is produced from read generator 47, proper pulse shaping is provided by the RLC circuit comprising inductor 334, capacitor 335 and resistor 336. Due to flow rise of current through inductor 334, capacitor 332 provides holding current for diode 330 through current limiting resistor 333 until current through inductor 334 builds up to an amplitude above diode 330 holding current amplitude.

If the proper address is detected by cores C8 and C10 in the field shift register, the input to AND circuit 48 from field address detector 46 of FIG. 1B receives no input current. If the field transmit flip-flop circuit of FIG. 1B is now in its transmit stop, or off condition, a negative voltage is produced from the flip-flop circuit which is amplified through transmit inhibit amplifier 57 and coupled to the base of transistor 341, causing the transistor to conduct. Conduction of this transistor applies biasing potential to the base and emitter of transistor 340 from the emitter of transistor 341.

When the "tag" core in the field shift register becomes set, transistor 340 starts conducting. The collector of the transistor then swings negative, halting current flow through diode 342 and causing conduction of four-layer diode 330, as previously mentioned. Moreover, the cathode of four-layer diode 320 also swings negative, causing conduction thereof.

Conduction of four-layer diode 330 produces current $P_{RS}$ which clears the cores of the field message storage circuit and simultaneously provides read prime current for the even numbered cores of the field shift register, with the exception of the "tag" and address cores. Conduction of four-layer diode 320 produces serial prime current $P_{OS}$ for the odd-numbered field shift register cores in preparation for receipt of information by the aforementioned cores for transmission from the field station.

After occurrence of the read prime current, field advance driver 41 produces an even pulse. This causes readout from the field shift register into message storage unit 49 and address detector 46, as previously explained. In addition, the field shift register "tag" core is also cleared. Simultaneously, prime current $P_{ES}$ is applied to the even-numbered field shift register cores, with the exception of the "tag" core, since occurrence of an even pulse produced from field clock amplifier 42 provides a negative pulse on the cathode of four-layer diode 321, causing this four-layer diode to conduct. Utilization means 52 then repositions the contacts operated therefrom, applying a new code to the field shift register. Capacitor 322 serves substantially the same function in serial generator 60 as does capacitor 222 of the office read and serial generator shown in FIG. 4.

Figures 9, 10:
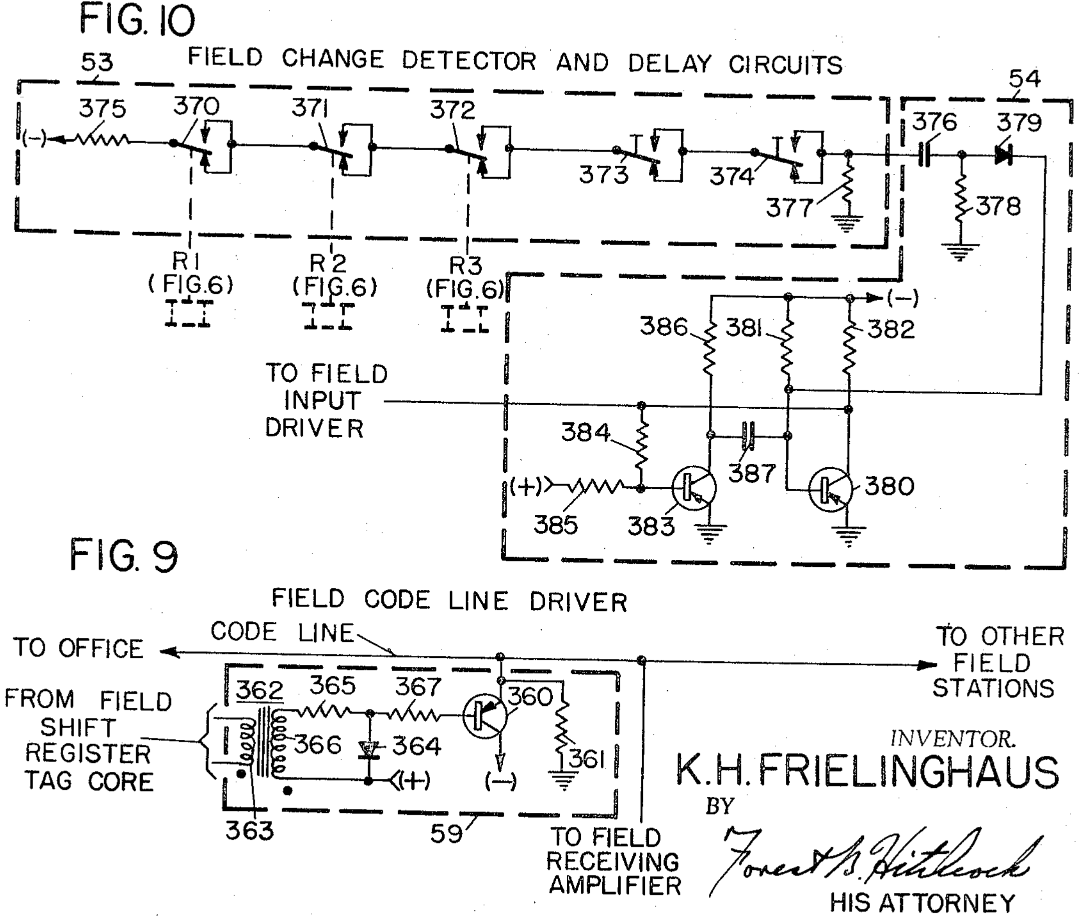
FIG. 9 is a schematic diagram of the field code line driver used in FIG. 1B.
FIG. 10 is a schematic diagram of the field chain detector and delay circuits used in FIG. 1B.

FIG. 9 is a schematic diagram of the field code line driver shown in block diagram form in FIG. 1B. This circuit produces negative code pulses on the code line, while being insensitive to positive code pulses on the same line. The circuit comprises a PNP transistor 360 with its emitter coupled to the code line and collector coupled to the negative side of the power supply. The emitter is also coupled to ground through an emitter bias resistor 361. Input to the transistor is applied to the base through a ferrite core transformer 362 having its primary winding 363 coupled through the major aperture of the "tag" core in the field shift register. The circuit is responsive to the set condition of the "tag" core since the ± terminal of the secondary winding 366 of transformer 362 is coupled to a positive terminal of the power supply and a series-connected diode 364 and resistor 365 is coupled across the secondary winding with the cathode of diode 364 coupled to the ± terminal of the secondary winding. The anode of diode 364 is coupled to the base of the transistor through a resistor 367.

When the tag core in the field shift register becomes set, the ± terminals of transformer 362 swing positive, driving the base of transistor 360 negative. Transistor conduction thereby begins coupling the code line to the negative side of the power supply.

When there is overshoot of the set pulse, and when the "tag" core is cleared, the ± terminals on the transformer swing negative, so that output from secondary winding 366 is shunted by resistor 365 and diode 364. Conduction of the diode then prevents this signal from reaching the base of transistor 360, thereby keeping the transistor from conducting. Moreover, under quiescent conditions, transistor 360 is non-conductive, since the base is biased positively through a series circuit comprising secondary winding 366 and resistors 365 and 367.

Turning now to FIG. 10 there is shown schematically change detector 53 and delay circuit 54, shown in block diagram form in FIG. 1B. Contacts 370, 371 and 372 of respective relays R1, R2 and R3 of the utilization means shown in FIG. 6, have their front and back contacts jumpered together, and are connected in series. Switch contacts 373 and 374, which may be operated in unison with other contacts on the same respective switches for applying information in parallel form to the odd-numbered cores of the field shift register, also have their front and back contacts jumpered together and are connected in series with contacts 370, 371 and 372. One end of this series circuit is coupled to the negative side of the power supply through a current limiting resistor 375, which may be coupled to the heel of contact 370. The jumper at the other end of the series contact circuit, namely, that across front and back contacts 374, is coupled to the input of delay circuit 54.

The change detector circuit comprises a capacitor 376 having its input side grounded through a resistor 377 and its output side grounded through a resistor 378. A diode 379 has its anode coupled to the output side of capacitor 376 and its cathode coupled to the base of a PNP transistor 380. Thus, in the quiescent condition, current flows through the closed contacts comprising the series contact circuit through resistors 377 and 375, which serve to limit the quiescent current flow.

The base of transistor 380 is coupled through a biasing resistor 381 to the negative side of the power supply. Thus, in the non-conducting condition of the transistor a quiescent current flow through the series circuit comprising resistor 378, diode 379 and resistor 381.

By maintaining the base of transistor 380 positive, the transistor is held non-conductive. No current thereby flows through a resistor 382 coupling the collector of transistor 380 to the negative side of the power supply. The collector is also coupled through a resistor 384 to the base of a second transistor 383 which is also coupled to the positive side of the power supply through a base bias resistor 385. Negative collector bias for transistor 383 is applied through a resistor 386. The collector of transistor 383 is also coupled to the base of transistor 380 through a capacitor 387. In the quiescent state, the base bias applied to transistor 383 maintains the transistor in a non-conductive condition.

In operation, with relays R1, R2 and R3 in a steady state condition, and with switches 383 and 384 in a steady state condition, the voltage across resistor 377 is substantially equal to the voltage across resistor 378, so that net voltage across capacitor 376 is substantially zero. If the change detector circuit 53 is thereafter momentarily opened, due to movement of any of contacts 370, 371, 372, 373 or 374, the input side of capacitor 376, which is coupled to change detector circuit 53, abruptly swings positive. This produces an abrupt positive voltage swing on the output side of capacitor 376, which is coupled through diode 379 to the base of transistor 380, cutting it off. This causes cessation of current flow through resistor 382, causing the collector of transistor 380 to swing negative. This negative voltage change is applied to the field input driver 55, of FIG. 1B. However, the field input driver is responsive only to positive pulses, so that the applied negative pulse has no effect thereon.

The negative pulse produced at the collector of transistor 380 is also applied to the base of transistor 383 through resistor 384, causing transistor 383 to start conduction. This causes the left side of capacitor 387 to swing positive, thereby driving the base of transistor 380 further positive and driving transistor 380 further into cutoff.

After the contact which has opened, again closes, current resumes flowing through resistor 377. This produces a negative pulse which is applied to the anode of diode 379. The diode prevents this negative pulse from reaching the base of transistor 380.

After transistor 383 begins conduction, the plate of capacitor 387 coupled to the collector of transistor 383 swings positive, driving the base of transistor 380 further positive, and transistor 380 further into cutoff, as previously explained. The charge on capacitor 387 then gradually leaks off through resistors 381 and 386, to the point where the base of transistor 380 becomes sufficiently negative to resume conduction. At this point, the collector of transistor 380 swings positive, applying a positive pulse to the field input driver 53. The field input driver then produces a positive output pulse which turns ON the field transmit flip-flop circuit and causes react-in to the field shift register from the utilization means. Simultaneously, the base of transistor 383 is driven positive through resistor 384, causing transistor 383 to become non-conductive. Capacitor 387 then charges with a polarity such that the plate coupled to the base of transistor 380 becomes positive with respect to the plate coupled to the collector of transistor 383.

Thus, there has been shown a telemetering system utilizing apertured magnetic cores both as storage means and means for reading in and reading out signals to both the control office and field stations. Any of a plurality of field stations may be selectively actuated from the control office and retransmits a code produced in response to a code received from the office without actuating any of the other field stations. The circuit is compact, rugged and requires minimal amounts of power for operation.

Although but one embodiment of the present invention has been described, it is to be specifically understood that this form is selected to facilitate in disclosure of the invention rather than to limit the number of forms which it may assume; various modifications and adaptations may be applied to the specific forms shown to meet requirements of practice, without in any manner departing from the spirit or scope of the invention.

What is claimed is:

1. A telemetering system comprising a control office including a shift register, means coupling a preselected coded message into the shift register, a field station including a shift register and utilization means, means communicating the message from the office shift register to the field station shift register, means actuating the utilization means in accordance with the coded message received by the field shift register, means coupling a signal responsive to the actuated condition of the utilization means into the field shift register including a change detector circuit, a time delay circuit, means coupling the output of the change detector circuit to the time delay circuit whereby the signal responsive to the actuated condition of the utilization means is momentarily delayed prior to being applied to the field shift register, and means communicating said responsive signal to the office shift register.

2. The telemetering system of claim 1 wherein said change detector circuit includes contacts connected in a series circuit, said contacts being driven from the utilization means, means coupling a source of voltage to one side of the series circuit, resistor means coupling the other side of the series circuit to ground, and said delay circuit includes a capacitor having one side coupled to the resistor means, second resistor means coupling the other side of the capacitor to ground, and means responsive to the voltage amplitude at said other side of the capacitor means for coupling a signal responsive to the condition of the utilization means into the field shift register.

3. A telemetering system comprising a control office including a shift register, means coupling a preselected coded message into the shift register, a plurality of field stations, each field station including a shift register and utilization means, means communicating the message from the office shift register to the field shift register at each field station, means actuating the utilization means at a field station selected in accordance with a portion of the coded message to a condition selected in accordance with the remainder of the message, means coupling a signal responsive to the actuated condition of the utilization means at the selected field station into the field shift register at the selected field station including a change detector circuit, a time delay circuit, means coupling the output of the change detector circuit to the time delay circuit whereby the signal responsive to the actuated condition of the utilization means is momentarily delayed prior to being applied to the field shift register, and means communicating said responsive signal to the office shift register.

4. A telemetering system comprising a control office including a shift register, a station activator circuit, means responsive to the station activator circuit coupling a preselected coded message into the shift register, a field station including a shift register and utilization means, means transmitting the message from the office shift register to the field shift register upon receipt of a signal from the station activator, means actuating the utilization means in accordance with the coded message received from the field shift register, inhibit signal generating means responsive to the output from the station activator circuit for rendering said station activator circuit inoperative and to the output from the field shift register for rendering said station activator circuit operative, means coupling a signal responsive to the actuated condition of the utilization means into the field shift register including a change detector circuit, a time delay circuit, means coupling the output of the change detector circuit to the time delay circuit whereby the signal responsive to the actuated condition of the utilization means is momentarily delayed prior to being applied to the field shift register, and means coupled to the field shift register transmitting said responsive signal to the office shift register.

5. A telemetering system comprising a control office including a shift register, a station activator circuit, means responsive to the station activator circuit coupling a preselected coded message into the shift register, a plurality of field stations, each field station including a shift register and utilization means, means transmitting the message from the office shift register upon energization of said station activator circuit to the field shift register at each field station, means actuating the utilization means at a field station selected in accordance with a portion of the coded message to a condition selected in accordance with the remainder of the message, means coupling a signal responsive to the actuated condition of the utilization means at the selected field station into the field shift register at the selected field station including a change detector circuit, a time delay circuit, means coupling the output of the change detector circuit to the time delay circuit whereby the signal responsive to the actuated condition of the utilization means is momentarily delayed prior to being applied to the field shift register, and means coupled to the field shift register transmitting said responsive signal to the office shift register, message storage means and address decoder means coupled to said office shift register, station code indicator means, means coupling said station code indicator means to said message storage means, means coupling said address decoder means to said message storage means for controlling energization of the proper station code indicator means from said message storage means in accordance with the address of said selected field station.

References Cited

UNITED STATES PATENTS

| | | | |
|---|---|---|---|
| 3,215,994 | 11/1965 | Dowling | 340—174 |
| 3,244,805 | 4/1966 | Evans | 340—163 X |
| 3,252,138 | 5/1966 | Young | 340—151 X |

FOREIGN PATENTS

| | | |
|---|---|---|
| 884,295 | 12/1961 | Great Britain. |

NEIL C. READ, *Primary Examiner.*

D. J. YUSKO, *Assistant Examiner.*